Patented Dec. 22, 1931

1,838,038

UNITED STATES PATENT OFFICE

ROBERT HALLER, OF RIEHEN, NEAR BASEL, AND ALPHONSE HECKENDORN, OF BASEL, SWITZERLAND, ASSIGNORS TO THE FIRM OF SOCIETY OF CHEMICAL INDUSTRY IN BASLE, OF BASEL, SWITZERLAND

CELLULOSE DERIVATIVES AND PROCESS OF MAKING SAME

No Drawing. Application filed December 9, 1929, Serial No. 412,926, and in Switzerland December 15, 1928.

The present invention relates to the manufacture of new cellulose derivatives containing sulfur and nitrogen, which may be very valuable textile materials. It comprises the process for making these new products, the new products themselves, and the textiles containing the new products.

It is known that in treating alkali cellulose with carbon bisulfide, there is very rapid development of a yellow color in the cellulose and a complete destruction of the fiber with production of a product soluble in water, namely cellulose xanthate.

When, on the other hand, alkali cellulose is treated with a mixture of carbon bisulfide and alkylating agents, this term including aralkylating agents, there is also produced a change in the cellulose accompanied by a considerable increase in the weight of the fiber, but the products formed are not soluble in water and retain completely the original fibrous structure; the products thus obtained have a very high capacity for undergoing reaction with, for example, organic bases containing at least one hydrogen atom linked to a nitrogen atom, and other active bodies, such as, for example, mono- or di-methylamine or mono- or di-ethylamine, aniline, dimethyl-para-phenylenediamine, piperazine, ethylenediamine, diethylethylenediamine, or the like, whereby further products, which are insoluble in aqueous alkalies, are obtained which exhibit a fundamental change in the dyeing properties of the cellulose material. For instance, the products may have an outstanding affinity for acid dyestuffs, and to a certain extent also for insoluble acetate silk dyestuffs.

Particularly valuable and easily accessible are in this respect the products which, with retention of the original structure of the cellulose materials used, are obtained, on the one part, with aid of such halogen alkyls which do not contain more than 4 carbon atoms, and the β-carbon of which carries a double bond, such as allyl halides, or chloracetic acid alkyl esters or bromacetic acid alkyl esters, and, on the other part, with aid of diamines of aliphatic character, such as dialkyl-ethylenediamines or piperazine.

The constitution of the new products is not known, but it can with certainty be assumed that the cellulose residue is present without having undergone a substantial alteration, and that by the intermediary of the carbon atom of the xanthogenate residue sulfur and an amine residue are coupled with the cellulose molecule.

The present invention is based on the observations recorded in the preceding paragraphs and is illustrated by the following examples.

Example 1

The cellulose material is impregnated in the cold with caustic soda solution of 20 per cent, strength and the alkali cellulose thus made is treated in a solution of an alkyl halide in carbon bisulfide in either of the following manners:

(a) *With chloracetic ester.*—A solution of, for example, 100 parts of chloracetic ester in 600 parts of carbon bisulfide is allowed to act on the soda cellulose in the cold for 1 to 2 days; the material is then rinsed for a short time in cold or warm water.

The material thus prepared is now, without previous drying, warmed on the water-bath for 1 to 2 hours in an aqueous solution of 10 per cent. strength of piperazine (or diethylethylenediamine, or the like); it is then rinsed for ½ hour in hot water. The material is almost quite white; its grip and tensile strength remain satisfactory. Acid wool dyestuffs (for instance tartrazine, benzyl violet 10B) dye the material deeply. It may also be dyed by means of insoluble dyestuffs, such as, among others, those which are suitable for acetate silk.

(b) *With allyl bromide.*—A solution of about 100 parts of allyl bromide in 600 parts of carbon bisulfide is caused to act on the soda cellulose for 1 to 4 hours in the cold and the bright yellow material, smelling of garlic, is then rinsed in cold or warm water.

The material thus prepared is now, without previous drying, warmed for 1 to 2 hours on the water-bath in an aqueous solution of 10 per cent. strength of diethyl-ethylenediamine (or piperazine, or the like), that is to say until the yellow color passes to grey-white. After having been rinsed in hot water for ½ hour, the material is almost quite white. The grip and tensile strength remain satisfactory. The dyeing properties of the new product are the same as those of the product obtained as described under (a). A like result is obtained when benzyl chloride is substituted for allyl bromide.

Example 2

Cotton yarn is treated with an alcoholic potassium solution containing between 5 and 20 per cent. of potassium hydroxide, and prepared by dissolution of potassium hydroxide in alcohol, and then introduced for 1½ hours into a 10 per cent. solution of allyl bromide in carbon bisulfide. It is then rinsed, hydro-extracted, and heated on the water-bath in an aqueous solution of piperazine of 10 per cent. strength. After the reaction is complete, the material is rinsed with hot water. The material thus obtained contains sulfur and nitrogen. It has retained the structure and strength of the cotton yarn and has strong affinity for acid dyestuffs.

For piperazine there may be substituted diethyl-ethylenediamine, benzylamine, aniline, etc. Instead of allyl bromide there may be used the most varied halogen alkyls, such as, inter alia, chloracetic ester, benzyl chloride, or mixtures, such as mixtures of benzyl chloride and allyl bromide. According to the nature of these products the affinity for acid dyestuffs and for insoluble acetate silk dyestuffs may more or less strongly be pronounced.

The same results are also obtained by impregnating shaped cellulose (for example yarns) with alcoholic caustic alkalies, then converting it with retention of the structure into cellulose xanthogenate by the action of carbon bisulfide, and finally treating the cellulose xanthogenate yarn successively with halogen alkyls and with bases. Instead of halogen alkyls other alkylating agents may be used, such as, for example, diethyl sulfate.

What we claim is:—

1. The manufacture of new cellulose derivatives, consisting in treating alkali cellulose with a mixture of carbon bisulfide and alkylating agents, and then subjecting the product to the action of an organic amine containing at least one hydrogen atom linked to a nitrogen atom.

2. The manufacture of new cellulose derivatives with conservation of the original structure of the fiber, consisting in treating alkali cellulose with a mixture of carbon bisulfide and alkyl halide, and then subjecting the product to the action of an organic amine containing at least one hydrogen atom linked to a nitrogen atom.

3. The manufacture of new cellulose derivatives with conservation of the original structure of the fiber, consisting in treating alkali cellulose, prepared with aid of alcoholic caustic alkalies, with a mixture of carbon bisulfide and alkyl halide, and then subjecting the product to the action of an organic amine containing at least one hydrogen atom linked to a nitrogen atom.

4. The manufacture of new cellulose derivatives with conservation of the original structure of the fiber, consisting in treating alkali cellulose, prepared with aid of alcoholic caustic alkalies, with a mixture of carbon bisulfide and benzyl chloride, and then subjecting the product to the action of an organic amine containing at least one hydrogen atom linked to a nitrogen atom.

5. The manufacture of new cellulose derivatives with conservation of the original structure of the fiber, consisting in treating alkali cellulose, prepared with aid of alcoholic caustic alkalies, with a mixture of carbon bisulfide and such halogen alkyls which do not contain more than 4 carbon atoms, and the $\beta$-carbon atom of which carries a double bond, and then subjecting the product to the action of an organic amine containing at least one hydrogen atom linked to a nitrogen atom.

6. The manufacture of new cellulose derivatives with conservation of the original structure of the fiber, consisting in treating alkali cellulose, prepared with aid of alcoholic caustic alkalies, with a mixture of carbon bisulfide and chloracetic ester, and then subjecting the product to the action of an organic amine containing at least one hydrogen atom linked to a nitrogen atom.

7. The manufacture of new cellulose derivatives with conservation of the original structure of the fiber, consisting in treating alkali cellulose, prepared with aid of alcoholic caustic alkalies, with a mixture of carbon bisulfide and chloracetic ester, and then subjecting the product to the action of diamines of aliphatic character containing at least one hydrogen atom linked to a nitrogen atom.

8. The manufacture of new cellulose derivatives with conservation of the original structure of the fiber, consisting in treating alkali cellulose, prepared with aid of alcoholic caustic alkalies, with a mixture of carbon bisulfide and chloracetic ester, and then subjecting the product to the action of piperazine.

9. As new products the new cellulose derivatives which have retained the original fibrous structure, and which contain besides sulfur the residue of an organic diamine of aliphatic character in their molecule, which products have an excellent affinity for dyestuffs to be dyed in an acid bath, said products being insoluble in aqueous alkalies.

10. Textiles containing the new products of claim 9.

In witness whereof we have hereunto signed our names this 27th day of November, 1929.

ROBERT HALLER.
ALPHONSE HECKENDORN.